2,961,445

PYRIDYLALKYLTHIOALKYL AND OXYALKYL PHOSPHOROTHIOATES

George A. Saul, Nitro, W. Va., assignor to Monsanto Chemical Company, St. Louis, Mo., a corporation of Delaware No Drawing. Filed Aug. 25, 1958, Ser. No. 757,104

4 Claims. (Cl. 260—294.8)

The present invention is directed to new phosphorothioates. More particularly, the invention relates to pyridylalkyl or alkyl substituted pyridylalkylthioalkyl phosphorothioates and their use as insecticides.

The new compounds may be represented by the general formula

where R represents a lower alkyl group, X, X' and X'' represent sulfur or oxygen, at least one of X and X' being sulfur, A and A' represent alkylene, preferably methylene or ethylene, and Y represents a pyridyl or lower alkyl substituted pyridyl radical having a carbon atom in the pyridine ring attached to A'.

The products of the present invention are useful for the purpose of combatting a variety of insects, including the mobile, resting and egg stages of the two-spotted spider mite, red flour beetles and Mexican bean beetles.

In use as insecticides, the compounds are suitably formulated as wettable powders, emulsifiable concentrates or as a dust formulation wherein the active ingredient is mixed with a finely divided solid carrier, as for example talc, clay, pyrophyllite, silica and fuller's earth. Other adjuvants such as wetting and emulsifying agents may be added as desired.

The insecticidal properties of these compounds as well as their preparation, are illustrated by the following examples. These examples are not in any way limiting.

Example 1

Pyridylethylthioethyl chloride is prepared by adding one mole of mercaptoethanol to one mole of 2-vinylpyridine over a 25 minute period. The temperature is maintained at 25–65° C. by means of a water bath during the addition. The mixture is then heated to 77° C. and held at this temperature for 4 hours. The product is stripped under vacuum and then to 122.3 grams (0.67 mole) of the pyridylethylthioethanol so prepared are added 89.2 grams (0.75 mole) of thionyl chloride in 100 ml. of chloroform. The temperature is maintained at 35–45° C. during the addition by means of an ice bath. The mixture is then heated to 50–55° C. and held at this temperature for 2 hours and 20 minutes, after which it is stripped to 90° C. at 30 mm. A 119 gram portion is neutralized in aqueous solution by 55 grams of sodium carbonate. The oily layer which separates is washed with water, taken up in 30–60° C. petroleum ether and the solvent stripped off to a pot temperature of 40° C. at 40 mm. The pyridylethylthioethyl chloride thus obtained contains 17.2% chlorine and 6.6% nitrogen as compared to 17.7% chlorine and 7.0% nitrogen calculated.

A solution of 84.0 grams (0.44 mole) of O,O-diethyl phosphorodithioic acid in 150.0 grams (0.44 mole) of 20% sodium ethylate is prepared and to it is added at 20° C. over a three minute period 80.6 grams (0.4 mole) of pyridylethylthioethyl chloride. The reaction mixture is heated by means of a mantle to boiling and is refluxed at 82.5° C. for a 6 hour period. The solvent is then stripped off to 90° C. pot temperature. The remaining product is quenched with water, washed with dilute sodium carbonate and then again with water. The water wash is benzene extracted, the extract combined with the product and the benzene stripped off to 100° C. at 30 mm. The O,O-diethyl S-2-[2-(2-pyridyl)ethylthio]ethyl phosphorodithioate so obtained is a dark red liquid in 87.5% yield containing 3.8% nitrogen as compared to the calculated value of 4.0%.

Example 2

A solution of 56.2 grams (0.3 mole) of ammonium O,O-diethyl phosphorothioate in 156 grams of anhydrous ethanol is prepared and to it is added 60.5 grams (0.3 mole) of pyridylethylthioethyl chloride. The reaction mixture is heated by means of a mantle to boiling and is refluxed for about 8 hours. O,O-diethyl S-2-[(2-pyridyl)ethyl]thioethyl phosphorothioate isolated as in Example 1 is a dark liquid.

Example 3

A mixture of 100 grams (0.43 mole) of technical O,O-diethyl phosphorodithioic acid and 61 grams (0.43 gram) of 2-pyridylethyl mercaptan is prepared and 38 grams (0.46 mole) of 37% aqueoues formaldehyde added during 45 minutes. The reactants are stirred for about 3 hours without heating and then stirred at about 90° C. for 3 hours longer. The product is separated from the water layer, washed twice with water and stripped of volatiles by heating on a steam bath in vacuum. O,O-diethyl S-[2-(2-pyridyl)ethylthio]methyl phosphorodithioate is a dark mobile oil.

Substitution in equivalent molecular proportions of 2-pyridylethanol and 3-pyridinemethanethiol respectively in the foregoing procedure yields O,O-diethyl S-[2-(2-pyridyl)ethoxy]methyl phosphorodithioate and O,O-diethyl S-(3-pyridyl)methyl-thiomethyl phosphorodithioate both as dark liquids. Other suitable reactants are 4-pyridylethanol and 2-pyridylpropanol, 3-pyridylpropanol and 4-pyridylpropanol.

As illustrative of the insecticidal activity of the new class of products, the product of Example 1 resulted in 100% kill of adult two-spotted spider mite and all eggs destroyed at a concentration of 0.2%, when sprayed on infested plants. All eggs were destroyed by a concentration of 0.0125% of the product and at the same concentration there resulted 100% kill of the two-spotted spider mite mobile stages and 50% kill of the resting stages.

Likewise, there resulted a 100% kill of red flour beetles by the residue left on a 9 cm. filter paper treated with one ml. of a 1.0% solution of the product of Example 1 and at a concentration of 0.2% a 100% kill of the Mexican bean beetle larvae resulted.

The product of Example 1 was tested as a systemic insecticide by immersing excised stems of bean plants in emulsion of the chemicals for 3 days. The leaves were then cut off, infested with Mexican bean beetle larvae and the percent kill noted after 48 hours. With an emulsion of 0.004% concentration, a kill of 90% was noted.

It is intended to cover all changes and modifications of the examples of the invention herein chosen for purposes of disclosure which do not constitute departures from the spirit and scope of the invention.

What is claimed is:

1. A compound of the structure

where R is a lower alkyl group, X, X' and X'' are selected from a group consisting of oxygen and sulfur at least one of X and X' being sulfur, A represents $(CH_2)_n$ where $n$ is an integer from 1 to 2, A' represents $(CH_2)_{n'}$ where $n'$ is an integer from 1 to 3 and Y is selected from a group consisting of pyridyl and lower alkyl substituted pyridyl radicals having a carbon atom in the pyridine ring attached to A'.

2. A compound of the structure

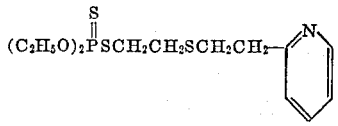

3. A compound of the structure

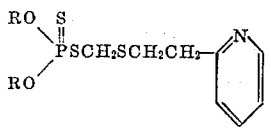

where the R's represent lower alkyl groups.

4. A compound of the structure

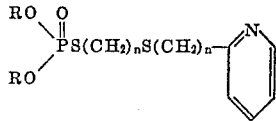

where the R's represent lower alkyl groups and $n$ is an integer from 1 to 2.

References Cited in the file of this patent

UNITED STATES PATENTS

| | | |
|---|---|---|
| 2,706,194 | Morris et al. | Apr. 12, 1955 |
| 2,709,127 | Grosskopf | May 24, 1955 |
| 2,889,330 | Baker et al. | June 2, 1959 |

FOREIGN PATENTS

| | | |
|---|---|---|
| 713,278 | Great Britain | Aug. 11, 1954 |

OTHER REFERENCES

Frear et al., J. of Economic Entomology, vol. 40, pp. 736–741 (1947).